May 21, 1968  J. O. EDMUNDS  3,383,949

POWER TRANSMISSION

Filed Feb. 1, 1966

INVENTOR.
John O. Edmunds
BY
Charles R. White
ATTORNEY

United States Patent Office 3,383,949
Patented May 21, 1968

3,383,949
POWER TRANSMISSION
John O. Edmunds, Indianapolis, Ind., assignor to General Motors Corporation, Detroit, Mich., a corporation of Delaware
Filed Feb. 1, 1966, Ser. No. 524,212
16 Claims. (Cl. 74—688)

ABSTRACT OF THE DISCLOSURE

A transmission having a first power path through a variable capacity torque converter to a first input of a power combining gearset and second and third power paths through fluid couplings and change speed spur gearing to a second input of the power combining gearset. The transmission has split torque drives through the first and second or first and third power paths with hydraulic shifts between the second and third power paths achieved by selective dump and fill of the couplings; converter torque absorption capacity is decreased as the transmission is upshifted to prevent any lugging of the transmission by the converter so that the engine can operate at an optimum speed and power level.

---

Figure 1:
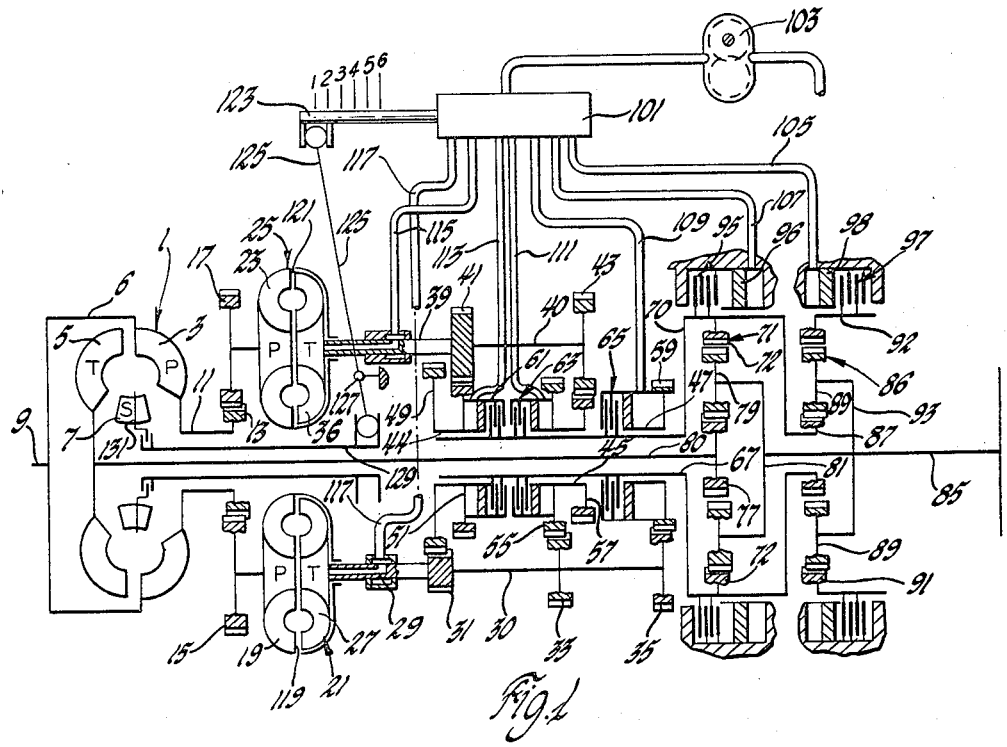

This invention relates to transmissions and more particularly to power transmissions having change ratio gearing and a hydrodynamic torque converter in which the capacity of the converter is automatically varied on predetermined ratio change.

In many prior torque converter transmissions having split torque drive, a fixed capacity torque converter was carefully matched with the engine to absorb maximum engine torque in low range. As torque requirements decreased and the transmission upshifted, the converter would tend to lug the powerplant down, reducing the speed and power level thereof. This detracted from the efficiency and performance of the engine and transmission.

The present invention features a torque converter transmission in which the capacity of the converter is reduced on predetermined gear ratio change to higher drive ranges so that the converter will not lug the engine down and the engine can operate at a high speed and power level. This invention utilizes multiple power paths which are combined by planetary gearing connected to the transmission output. One of these power paths includes a variable capacity torque converter, while other power paths include fluid couplings and change ratio gearing to vary the input into power-combining gearing. In a preferred embodiment of the invention, transmission gearing providing a plurality of ratios is controlled by a common friction clutch, and stepped ratio change may be accomplished by filling a first coupling and dumping a second coupling. In a second embodiment, each ratio has a separate friction clutch which must be individually employed when ratio change is made.

An object of this invention is to provide a transmission having a torque converter and variable ratio gear unit and means to vary the capacity of the torque converter in accordance with variations in ratio of the variable ratio gear unit.

Another object of this invention is to provide a torque converter transmission having a multi-ratio gear unit in which the torque absorption capacity of the converter is reduced in a graduated manner in accordance with upshift of the multi-ratio gear unit and increase in a graduated manner in accordance with downshift of the multi-ratio gear unit.

Another object of this invention is to provide a transmission having a first power path including a fluid coupling and a second power path including a hydrodynamic torque converter, a power-combining gear set, and a mechanism to reduce the torque absorption capacity of the converter as the torque requirements of the transmission decrease from low to high range operation.

Another object of this invention is to provide a transmission having a first power path through a torque converter into torque-combining range gearing, a second power path through a fluid coupling and change-ratio spur gearing into the combining gear set, and a third power path through another fluid coupling and associated change-ratio spur gearing into an input in the combining gear set, and controls for gear ratio change including controls for dumping one coupling and filling another, thereby providing a hydraulic shift.

Figure 2:
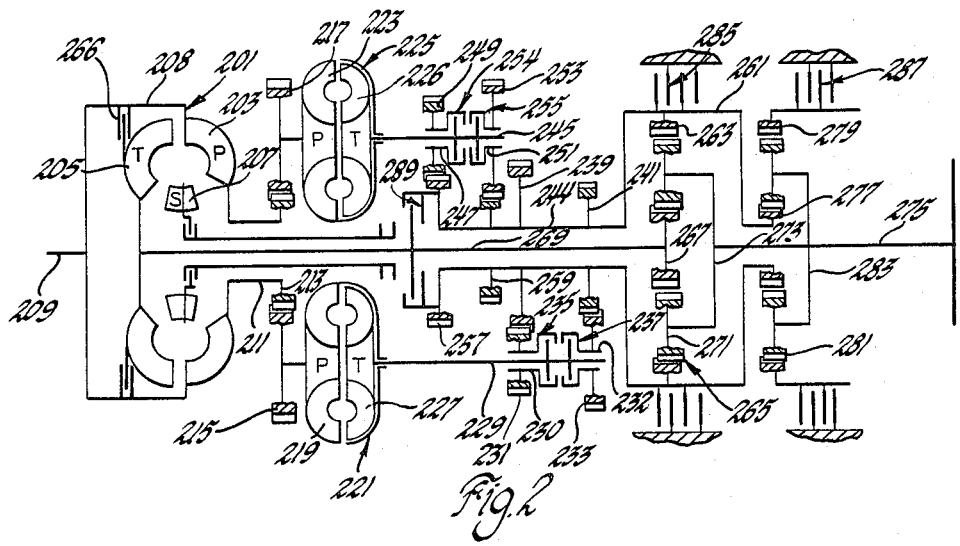

These and other objects and features of this invention will become more apparent from the following specification and drawing in which:

FIGURE 1 is a diagrammatic view of a preferred embodiment of this invention and FIGURE 2 is a diagrammatic view of a second embodiment of this invention.

As shown in FIGURE 1, the transmission includes a hydrodynamic torque converter 1, which has a pump 3, turbine 5, and variable pitch stator 7. The pump is suitably connected to a converter housing 6 that is driven by an input 9. A sleeve shaft 11 is connected to the pump and drives a connected spur gear 13. This spur gear meshes with spur gears 15 and 17 which have the same pitch diameter. As shown, spur gear 15 drives pump 19 of fluid coupling 21, while spur gear 17 drives the pump 23 of fluid coupling 25.

Coupling 21 includes a turbine 27 which drives an elongated sleeve shaft 29 and coupled shaft 30. As shown, shafts 29 and 30 have spaced spur gears 31, 33 and 35 which have respectively increasing pitch diameter secured thereto. The coupling 25, which is similar to coupling 21, has a turbine 36 which drives an elongated sleeve shaft 39 and coupled drive shaft 40. Shafts 39 and 40 have spur gears 41 and 43, with spur gear 43 having a pitch diameter greater than that of spur gear 41. The spur gears on the shafts driven by the two turbines of the coupling mesh with spur gears on sleeve shafts 44, 45 and 47. Spur gear 49 of shaft 44 meshes with spur gear 31 for one ratio, and smaller spur gear 51 of this shaft meshes with spur gear 41 for another ratio. The spur gears 55 and 57 on shaft 45 mesh respectively with spur gear 33 on shaft 30 and spur gear 43 on shaft 40 for other ratios. Spur gear 59 on shaft 47 meshes with spur gear 35 on shaft 30 to provide yet another ratio. The ratios of these meshing spur gears are different and decrease in the order described and as illustrated in the drawing.

Selectively engageable clutches 61, 63 and 65 are operable by control means which will be described to selectively connect the different ratios to the input of a planetary gear unit 71 which provides the low speed forward and power combining gearing of this transmission. This input includes an elongated sleeve shaft 67 that extends through the sleeve shafts 44, 45 and 47 to a drum 70 which encloses the planetary gear set 71. This gear set includes a ring gear 72 secured to the interior of the drum, a sun gear 77, and planetary gears 79 which mesh with the ring and sun gears. The gear set includes a carrier 81 which rotatably supports the planetary gears and provides a connection to the transmission output 85. As shown in the drawing, the sun gear 77 is driven by an elongated drive shaft 80 which extends from the converter turbine 5. A second planetary gear set 86 which provides reverse drive includes a sun gear 87 which is suitably coupled to the drum 70, planets 89, and a ring gear 91 which is secured to an annular drum 92. A carrier 93 for the planets 89 is coupled to the output shaft 85.

A friction-drive-establishing device or brake 95 includes a series of friction plates which are engageable by hydraulically-actuated piston 96 to retard rotation of the ring gear 72 to establish the low transmission drive ratio as will be described further below. A second friction-drive-establishing device or brake 97 includes a series of friction plates which are packed by operation of hydraulically-actuated piston 98 to retard the rotation of ring gear 91 and condition the transmission for a reverse drive. The friction-drive-establishing devices 61, 63 and 65 also have friction plates which are engageable by hydraulically-actuated piston members to selectively couple the sleeve shafts 44, 45 and 47 to the drum 70 so that the different ratios may be utilized to drive the ring gear 72 for stepped ratio change.

A suitable valve 101 which is supplied with fluid by pump 103 controls the flow to and from the various friction devices in this transmission. Lines 105, 107, 109, 111 and 113 respectively connect the friction devices 97, 95, 65, 63 and 61 to the control valve 101. Suitable means are provided for selectively filling and emptying the two fluid couplings. This may be done by utilizing the control valve 101 and connecting the fluid couplings to this control valve by lines 115 and 117. These lines selectively control this flow of fluid into these couplings. As shown, these couplings have exhaust openings 119 and 121.

Means are provided to vary the torque absorption capacity of the torque converter as the speed ratio increases from a low drive range to the highest drive range. The control rod 123 for the valve 101 can be actuated by the vehicle operator. Movement of rod 123 will move lever 125 pivoted at 127. The lower end of this lever is connected to a sleeve shaft 129 which is coupled to the cranks 131 which rotatably support the torque converter stator blades within the converter. As the lever 125 is moved in accordance with the positioning of the control rod 123 toward higher range drive, the shaft 129 will be moved to turn the stator blades from a low angle in which there is high torque absorption capacity toward higher angles in which the torque absorption capacity of the converter is progressively reduced.

In operation, the rod 123 is moved to the first position for low range drive and the stator blades will be in their lowest angle with respect to the converter centerline for high converter torque absorption. Brake 95 is engaged since line 107 conducts pressure fluid to the piston 96. All other brakes and clutches are off. Under these conditions, the ring gear 72 is held for reaction, the sun gear 77 of planetary set 71 is driven forwardly by shaft 80, and the carrier 81 and connected output shaft 85 will be driven forwardly at reduced speed and at the highest available torque multiplication ratio. This is an all-converter drive.

As the rod 123 is moved to the second position, the stator blades will be moved to a slightly higher angle for reduced capacity through action of lever 125, shaft 129, and cranks 131. Line 107 leading to the piston 96 will be exhausted and line 113 leading to the clutch 61 will conduct pressure fluid to the piston of this friction device so that the ratio provided by spur gears 31 and 49 can drive the ring gear 72 of the planetary gear set 71 forwardly. It will be appreciated at this time the fluid coupling 21 is filled and coupling 25 is exhausted. The power paths through the converter and coupling 21 are combined by the gear set 71. With ring gear 72 driven forwardly at a reduced speed as compared to the sun gear 77, the speed of the output shaft 85 will be increased.

When the rod 123 is moved into the third position, the stator blades will be further turned to further reduce the converter capacity. The supply of fluid into coupling 21 will be cut off and the coupling will exhaust through the opening 119 and fluid will be supplied to the coupling 25 through line 115. Under these conditions, a third ratio provided by spur gears 51 and 41 will drive the ring gear 72 forward at increased speeds as compared to the ratio provided by spur gears 31 and 49. This drive is split torque. It will be appreciated that this gear change is made through the emptying and filling of the hydraulic couplings and thus does not require friction clutches as in other devices of this general nature.

For fourth range split torque drive, the control rod 123 is placed into the fourth position, and during this time the stator blades will be moved to yet a higher angle position in which the capacity of the converter is further reduced and the line 113 is opened to exhaust while line 111 for friction device 63 conducts pressure fluid into the chamber behind the operating piston for this device. At this time, the coupling 25 is exhausted and coupling 21 is filled so that the ratio provided by the spur gears 33 and 55 drive the ring gear 72 of the planetary gear unit at a further increase in speed.

For fifth range, split torque drive, rod 123 is moved to the fifth position and the converter capacity is further reduced. Friction device 63 is still engaged. Coupling 21 is emptied and coupling 25 is filled so that spur gears 43 and 57 will drive the ring gear 72 forward and the output of the transmission will be increased in speed and the torque multiplication ratio will be further reduced.

For sixth or high drive range, the rod 123 is moved to the sixth position, the stator blades are at their highest-angle, lowest-converter capacity position, the coupling 25 is emptied and coupling 21 is filled, friction device 63 is disengaged, and friction device 65 is engaged so that the spur gears 35 and 59 drive the ring gear 72. An appropriate ratio can be selected for gears 35 and 59 so that the ring gear 72 can be driven at the same speed that sun gear 77 is driven. Under these conditions, there is a lock-up of the planetary gear set 71 and the shaft 85 is driven forwardly in high range drive. Since the capacity of the converter to lug down the vehicle engine is substantially reduced, the engine can operate at high speeds and power level. This drive range has a high percentage of drive through the coupling rather than through the torque thus providing an efficient high speed drive.

For reverse, the control 123 is positioned in a reverse position, preferably to the left of the first range position of FIGURE 1. The piston 98 packs the friction plates of device 97 so that ring gear 91 of the gear set is held for reaction. With ring gear 91 held and input into sun gear 77, the carrier 93 will be driven with connected shaft 85 in a reverse direction for a reverse range drive.

Turning now to FIGURE 2, the transmission shown includes a hydrodynamic torque converter 201, having a pump 203, turbine 205, and stator 207. The pump is connected to the converter housing 208 driven by input 209. The pump circulates fluid in the torque converter and drives turbine 205 and connected sleeve shaft 211. The sleeve shaft is connected to a spur gear 213. This spur gear meshes with spur gears 215 and 217, having equal pitch diameters. The spur gear 215 drives the pump 219 of the fluid coupling 221, while spur gear 217 drives the pump 223 of fluid coupling 225.

The coupling 221 includes turbine 227 which drives a shaft 229. Sleeve shaft 230 having spur gear 231, and sleeve shaft 232 having spur gear 233 are mounted concentric with respect to shaft 229. These sleeve shafts and their spur gears are adapted to be selectively coupled to shaft 229 by engagement of clutches 235 and 237. Spur gear 231 meshes with spur gear 239 mounted on axially located sleeve shaft 244, while spur gear 233 meshes with a spur gear 241 also mounted on shaft 244.

The turbine 226 of the fluid coupling 225 drives elongated shaft 245. A sleeve shaft 247 having spur gear 249, and sleeve shaft 251 having spur gear 253 are mounted concentric with pump driven shaft 245. Selectively engageable clutches 254 and 255 are selectively engageable to connect the sleeve shaft 247 and its spur gear to the turbine driven shaft 245 or the sleeve shaft 251 and its spur gear 253 to shaft 245. Spur gear 249 meshes with spur gear 257 secured to shaft 244, and spur gear 253 meshes with spur gear 259 also on shaft 244. The meshing spur gears described have different pitch diameters to produce the different drive ranges described below.

Shaft 244 extends toward one end of the transmission and is coupled to a drum 261 which carries ring gear 263 of the planetary gear set 265 that forms the low range and power combining gearing of this transmission.

The planetary gear set 265 includes a sun gear 267 that is coupled to the elongated axial drive shaft 269 that is driven by the converter turbine 205. This planetary gear set includes planet gears 271 which mesh with the sun and ring gears and also includes a planet carrier 273 which is coupled to the transmission output shaft 275. A second planetary gear set for reverse drive has a sun gear 277 which is coupled to and driven by the drum 261, a ring gear 279, and planet gears 281 which mesh with the sun gear and ring gear. A carrier 283 for these planetary gears is coupled into the output shaft 275.

A brake 285 is selectively engageable to hold the ring gear 263 for reaction for low range drive and another brake 287 is selectively engageable to hold the ring gear 279 for reaction and condition the reverse planetary gearing for a reverse drive. A clutch 289 is selectively engageable to couple shafts 244 and 269 for high speed forward drive.

As in the first embodiment, the stator blades are pivotally mounted on cranks and are controlled in a similar manner so that the blades will be moved from the low angle to increasing high angle positions with respect to the centerline of the converter to decrease the torque absorption capacity of the converter as the transmission is conditioned for higher range drive. The control of this transmission may be substantially the same as those described in connection with the FIGURE 1 transmission and, therefore, are not further shown and described.

For low range drive, the brake 285 is applied, the ring gear 263 is held for reaction, and the drive will be all converter drive into the sun gear 267 and the carrier 273 will be driven forwardly at an increased torque multiplication ratio and reduced speed.

For second range with the sun gear 267 driven forwardly by the converter turbine, clutch 235 is applied so that sleeve shaft 230 is coupled to 229, and turbine 227 of the coupling, which is filled, can drive the spur gear 239, the connected shaft 244, and the connected ring gear 263 forwardly. Under these conditions, the carrier 273 and output shaft 275 will be driven at an increased speed and reduced ratio as compared to the first range drives.

For third range drive, the friction device or clutch 254 is applied and all other clutches are released. The coupling 225 is filled and coupling 221 may be emptied. The drive will be through the spur gears 249 and 257 and the ring gear 263 will be driven faster as compared to second range. The sun gear 267 is driven by the converter turbine and the transmission will be conditioned for its third highest ratio.

For fourth ratio, coupling 225 may be dumped, coupling 221 is filled, and clutch 237 is applied. The drive is through the spur gears 233 and 241 with output taken from the planetary gear carrier 273 as previously.

For fifth range drive, coupling 221 is dumped, coupling 225 is filled and clutch 237 is released and clutch 255 is engaged. The higher drive is through the spur gear 253 into the ring gear 263. Sun gear 267 is still driven forward by the converter turbine and the transmission is in fifth range drive.

For sixth range, lock-up is provided. Both couplings may be dumped. Clutch 289 is applied and all other clutches and brakes are released and ring gear 263 and sun gear 267 of the planetary gear set are coupled so the gear set is locked-up for the high range 1:1 drive. As the drive ratio is progressively changed from first to sixth range, the stator blades are moved to a progressively higher angle, lower converter capacity position. Thus, the converter does not have the capacity to lug the vehicle engine down, and it can be operated at high speeds and power level during the full range of operation. An optional clutch 266 may be applied for direct mechanical drive forward. For reverse, brake 287 is applied and the ring gear 279 is held for reaction. Input is into the sun gear 267 which is driven by the converter turbine, and under these conditions the carrier 283 is driven in a reverse direction along with the connected output shaft 275.

From the above detailed description of the embodiments of my invention, it will be appreciated that the torque absorption capacity of the converter 1 or 201 is gradually reduced in accordance with upshifts of the gearing unit and gradually increased in accordance with downshifts. This precludes the lugging of the vehicle engine by the converter and allows the engine to operate at optimum engine working speeds. Furthemore, if larger ratio steps are desired, e.g. 2–4–6 ratios, the hydraulic shifting need not be employed.

Although several embodiments of my invention have been described in detail, it will be understood that changes and modifications may be made thereto which do not depart from the spirit of the invention as disclosed nor from the scope thereof as defined in the appended claims.

I claim:

1. A power transmission having an engine driven input and having an output, a variable capacity torque converter and a change ratio gear unit driven by said input, drive means for connecting said gear unit and said torque converter to said output, said gear unit providing a low speed ratio and a higher speed ratio, ratio control means operatively connected to said gear unit operable to change the gear ratios between low and higher speed ratios, torque absorption capacity control means connected to said torque converter and to said ratio control means for automatically reducing the torque absorption capacity of said converter in response to operation of said ratio control means in upshifting said change ratio unit to thereby reduce converter power requirement for optimum transmission operation.

2. The power transmission of claim 1 in which said transmission includes at least two power paths, said converter forming one part of one power path and said change ratio unit forming part of a second power path, and a differential unit for combining the power transmitted by each of said power paths, said differential unit having an output coupled to said transmission output.

3. In a multi-speed power transmission, an input and an output, a plurality of separate power paths each leading from and operatively connected to said input, power combining means having a plurality of inputs and having an output member operatively connected to said transmission output, one of said paths benig coupled to a first input of said power combining means, a second of said paths including a fluid unit and a change ratio gear unit, a third of said paths including a fluid unit and a change ratio unit, said second and third paths being coupled to a second input of said power combining means, said last mentioned change ratio unit having ratios different than the ratios of said first mentioned change ratio unit, selectively engageable friction means for connecting and disconnecting said second and third power paths to said second input of said power combining means, and control means for selectively filling and emptying said fluid units for changing transmission ratios.

4. The power transmission of claim 3 in which said selectively engageable means is a friction device operative to simultaneously connect said second and third power paths to said second input of said power combining means.

5. The power transmission of claim 3 in which said selectively engageable means includes a first friction device operative to connect and disconnect said second path and said second input of said power combining means and includes a second friction device operative to connect and disconnect said third path and said second input of said power combining means.

6. In a multi-ratio power transmission, an input and an output, a plurality of power paths extending from said input, power combining means coupled to said power paths for combining power transmitted to said power combining means through said power paths, said power combining means having an output member operatively connected to said output, one of said power paths including a variable capacity torque converter, means operatively connected to said torque converter for automatically changing the capacity of said torque converter on predetermined ratio shift of said transmission, said power paths being formed by first, second and third power paths, said first power path including said variable capacity torque converter, said second and third power paths including a plurality of selectively operable clutch means for connecting said second path to said input and disconnecting said third path to said input and also for disconnecting said second path to said input and connecting said third path to said input.

7. The transmission of claim 6, wherein said plurality of selectively operable clutch means are first and second fluid couplings, means for filling said couplings with working fluid, means for exhausting fluid from said couplings, and controls operable to control the supply of working to said means for filling said fluid couplings.

8. The transmission of claim 6, wherein said selectively operable clutch means are first and second fluid clutches each having a pump and turbine, means for furnishing said couplings with fluid and means for exhausting fluid from said couplings, controls for controlling the supply of fluid to said couplings, a gear secured to each of said turbines for continuous rotation therewith, first and second gears meshing with the gears driven by said turbines, a drive shaft connected to one of said input members of said combining means, and selectively engageable friction means for simultaneously coupling said first and second gears to said drive shaft.

9. The transmission of claim 6, wherein said selectively operable clutch means are first and second fluid clutches each having a pump and turbine, a gear driven by each of said turbines, selectively engageable friction means for coupling said gears to said turbines, a drive shaft connected to one of said input members of said combining means, a plurality of gears mounted for continuous rotation with said drive shaft and meshing respectively with said gears driven by said turbines, said meshing gears providing different ratios for driving said last mentioned input of said combining means at different speeds.

10. The transmission of claim 7, a power combining unit having first and second inputs and an output member, said output member being connected to said output, said second power path having a reduction ratio for driving one of said input members of said combining unit to provide a transmission ratio upshift.

11. The transmission of claim 10, said second power path including a plurality of reduction ratios, said third power path including a plurality of reduction ratios differing from the ratios of said first power path, selectively engageable means for coupling a first ratio of the second path to said second input of said power combining unit, a second selectively engageable means for coupling a first ratio of said third path to said second input of said power combining unit, said second coupling being filled with working fluid and said first coupling being exhausted of working fluid so that said combining unit combines the power transmitted through said first and third power paths.

12. The transmission of claim 10, said second power path having a plurality of differing reduction ratios driven by the output of said first fluid coupling, said third power path including a plurality of reduction ratios, differing from said first mentioned reduction ratios, said last mentioned ratios being driven by the output of said second fluid coupling, first and second clutch means for selectively connecting said ratios to said second input of said power combining unit, said converter having an output connected to said first input of said power combining unit, said transmission output being driven by power through said first and second paths when said first coupling is filled with fluid and said second coupling is exhausted and by power through said first and third paths when said first coupling is exhausted of fluid and said second coupling is filled, said converter having variable pitch stator blades and linkage means for changing the pitch of said blades on change in transmission ratio.

13. The transmission of claim 10, in which said combining unit is a planetary gear set having first and second input members and an output member connected to said transmission output, said unit including second planetary gear set having an input connected to one of said input members, said second gear set further including a reaction member and an output member connected to said transmission output, and means for holding said reaction member for a predetermined drive ratio.

14. The transmission of claim 10, in which said converter has a variable pitch stator, means for progressively turning the blades of said stator from low-angle, high-capacity positions to high-angle, low-capacity positions as said transmission is upshifted in a stepped pattern from low to high range drives.

15. The transmission of claim 14, and further including control means for changing transmission ratio, said means for turning the blades of said stator being connected to said control means for operation thereby.

16. In a multi-ratio power transmission, an input and an output, a plurality of separate power paths each leading from said input, torque combining means having a plurality of input members and having an output member, one of said input members being connected to a first of said power paths, another of said input members being connected to a second of said power paths, said output member being operatively connected to said output of said transmission, said torque combining means being responsive to power delivered to both of said input members to drive said output member and said transmission output, one of said power paths including a variable capacity torque converter, means selectively engageable with one of said input members of said combining means to condition said transmission for a low speed drive ratio when said other of said input members is driven, means including a reduction ratio for driving said last mentioned input member for establishing a higher speed drive ratio, means for automatically changing the capacity of said converter on predetermined transmission ratio shift, said converter including a member having variable pitch vanes and said means for automatically changing converter capacity including means to change the pitch of said vanes and reduce converter capacity on upshift from said first to said second drive ratio.

References Cited

UNITED STATES PATENTS

| | | | |
|---|---|---|---|
| 2,572,007 | 10/1951 | Burtnett | 74—732 |
| 2,873,618 | 2/1959 | De Lorean | 74—732 X |
| 3,033,058 | 5/1962 | Kelley | 74—730 |
| 3,082,646 | 3/1963 | Friedmann et al. | 74—681 |
| 3,285,100 | 11/1966 | Peltner et al. | 74—688 |
| 3,296,891 | 1/1967 | Tuck | 74—688 X |

FRED C. MATTERN, Jr., *Primary Examiner.*

ARTHUR T. McKEON, *Examiner.*